Patented July 14, 1942

2,289,547

UNITED STATES PATENT OFFICE 2,289,547

GUANIDINE FERROCYANIDE COMPLEX

Urner Liddel, Greenwich, Conn., assignor to American Cyanamid Company, New York, N. Y., a corporation of Maine No Drawing. Application May 28, 1940, Serial No. 337,629

6 Claims. (Cl. 260—439)

The present invention relates to complex ferrocyanides containing a guanidine radical and alkali metal or ammonium as new compounds.

It has been discovered that guanidine may be introduced into a compound containing a ferrocyanide radical by double decomposition.

For instance, a saturated solution of sodium ferrocyanide, when mixed at room temperature with a saturated solution of guanidine carbonate, causes a precipitation of diguanidine disodium ferrocyanide in a very few minutes in the form of small flat crystals which have a waxy lustre when dry. The compound when recrystallized forms large yellow crystals of $Gu_2Na_2Fe(CN)_6.6H_2O$.

Similarly, the guanidine potassium salt may be formed by mixing saturated solutions of guanidine carbonate and potassium ferrocyanide causing a precipitation of $Gu_2K_2Fe(CN)_6.5H_2O$ as large, light yellow crystals which are difficult to dry.

Again, the corresponding ammonium salt may be formed by adding five mols of solid ammonium carbonate to a saturated solution of diguanidine disodium ferrocyanide at 45° C. After mechanically agitating the mixture for one-half hour and cooling to about 10° C., a fine, light yellow precipitate was obtained having the formula $Gu_2(NH_4)_2Fe(CN)_6$. An excess of ammonium carbonate is essential in this case as otherwise diguanidine disodium ferrocyanide will precipitate out.

Another satisfactory method of making the ammonium salt is to add solid diguanidine disodium ferrocyanide with six molecules of water of crystallization and solid ammonium carbonate in the ratio of 1:5 alternately to water heated to 45° C. with mechanical agitation. After one-half hour, the solution was cooled to 15° C. whereupon diguanidine diammonium ferrocyanide was precipitated.

In a similar manner, the above compounds may be formed using other soluble guanidine salts such as the hydrochloride and nitrate, although the carbonate is preferred due to its ease of solution in water.

These complex ferrocyanides containing guanidine may be used for the preparation of iron blues or light sensitive work, such as blueprints, inasmuch as they exhibit light instability. They are also useful as moth larvae repellents.

In the claims, the words "alkali metal" are used to include the radical ammonium.

While the invention has been described with particular reference to specific embodiments, it is to be understood that it is not to be limited thereto but is to be construed broadly and restricted solely by the scope of the appended claims.

I claim:
1. A guanidine alkali metal ferrocyanide.
2. Diguanidine disodium ferrocyanide.
3. Diguanidine dipotassium ferrocyanide.
4. A method of preparing a guanidine ferrocyanide which comprises reacting a saturated solution of an alkali metal ferrocyanide with a saturated solution of a water soluble guanidine salt.
5. A method of preparing a guanidine ferrocyanide which comprises reacting a saturated solution of an alkali metal ferrocyanide with a saturated solution of guanidine carbonate.
6. A method of preparing a guanidine ferrocyanide containing guanidine which comprises reacting a saturated solution of a sodium ferrocyanide with a saturated solution of guanidine carbonate.

URNER LIDDEL.

CERTIFICATE OF CORRECTION.

Patent No. 2,289,547.                                July 14, 1942.

URNER LIDDEL.

It is hereby certified that error appears in the printed specification of the above numbered patent requiring correction as follows: Second column, line 35, claim 6, strike out the words "containing guanidine"; and that the said Letters Patent should be read with this correction therein that the same may conform to the record of the case in the Patent Office.

Signed and sealed this 10th day of November, A. D. 1942.

(Seal)

Henry Van Arsdale,
Acting Commissioner of Patents.